Figure 1:
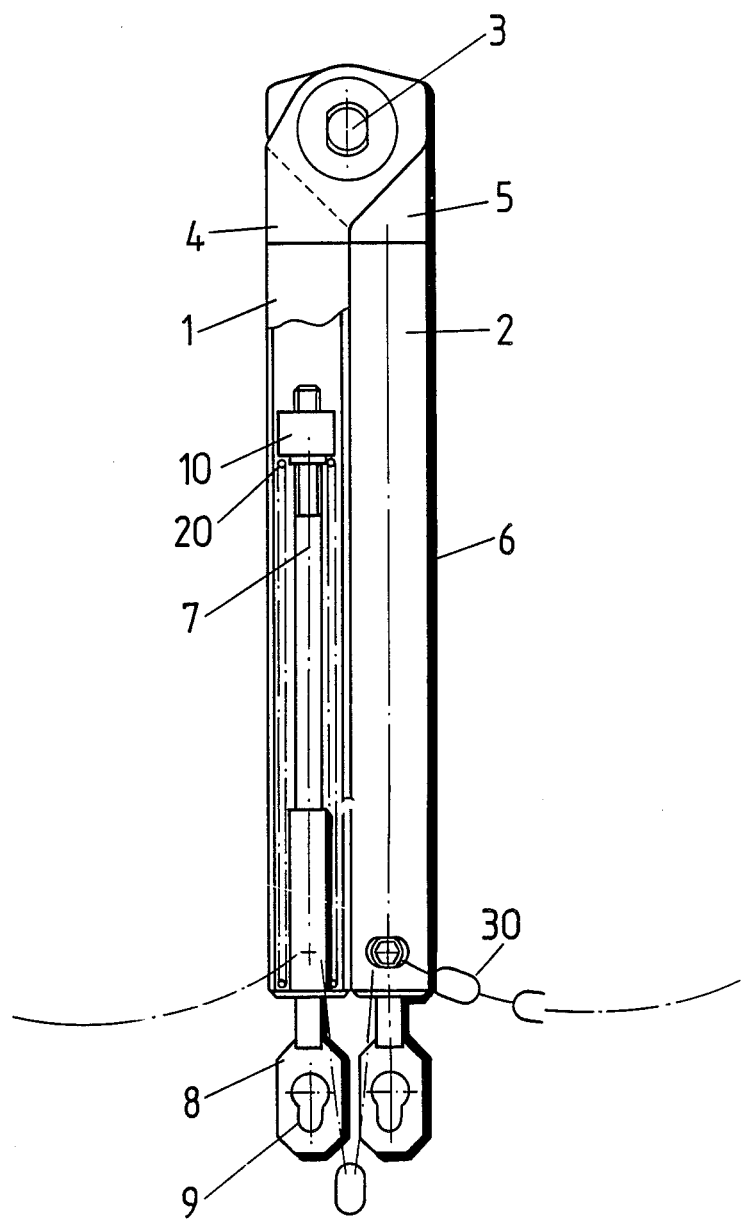

ated Patent [19]

Brown

[11] Patent Number: 4,874,512
[45] Date of Patent: Oct. 17, 1989

[54] FILTER PRESS CLOTH HANGER

[75] Inventor: Douglas W. Brown, Staffordshire, England

[73] Assignee: Coal Industry (Patents) Limited, London, England

[21] Appl. No.: 230,423

[22] Filed: Aug. 10, 1988

[30] Foreign Application Priority Data

Sep. 3, 1987 [GB] United Kingdom ............. 8720722

[51] Int. Cl.⁴ ............................................. B01D 25/32
[52] U.S. Cl. .................................... 210/225; 210/230; 100/198; 100/199
[58] Field of Search ...................... 210/224, 225, 230; 100/194, 196, 197, 198, 199, 200, 202

[56] References Cited

U.S. PATENT DOCUMENTS

| 4,129,137 | 12/1978 | Kurita et al | 210/225 |
| 4,659,465 | 4/1987 | Makinoda | 210/225 |
| 4,664,797 | 5/1987 | Kurita | 210/225 |
| 4,710,293 | 12/1987 | Davis | 210/225 |

FOREIGN PATENT DOCUMENTS

WO87/03504 12/1985 World Int. Prop. O. .

Primary Examiner—W. Gary Jones
Assistant Examiner—Matthew O. Savage
Attorney, Agent, or Firm—James Creighton Wray

[57] ABSTRACT

A filter press cloth hanger for a filter press comprising two arms joined at their upper ends by a pivot bolt which extends through platelike members welded to the tops of the arms. Each arm is similar in construction and comprises the hollow tubular outer wall in which slides a spring loaded rod. The rod carries at its lower end outside the arm a latching plate, which has a keyhold aperture, designed to fit over the end of a suspension member for a filter plate. The rod carriers at its free end within the hollow tubular outer wall, a stop member, which is screwed to the end of the rod and prevents the rod from being completely withdrawn from the tube. The stop is also profiled to prevent rotation of the rod within the arm and bears on one end of a compression spring which biases the rod in the arm. The pivot bolt carries a roller, which can run along a support bar, extending the length of the side bar filter press on which the hanger is to be used. The latching plate at each arm is fitted onto a support rod comprising the suspension member for each filter cloth and this rod is recessed in a manner so that the recess fits into the lower part of the keyhole aperture of each latching plate. This filter press cloth hanger may be used to support filter cloths on either side of a filter plate or filter cloths between two adjacent plates.

13 Claims, 6 Drawing Sheets

FILTER PRESS CLOTH HANGER

This invention relates to a filter press cloth hanger and is particularly concerned with cloth hangers for filter presses.

Particularly in coal preparation operations there is a need to deal with the problem of fines which are washed off the material being treated. One way of dealing with the fines is to filter them out is a suitable filter. There are many types of filter press available but one of the more popular ones is the filter press or pressure filter (side bar and overhead types) where the effluent material holding the fines in suspension is pumped through the press and the fines are trapped in chambers between filter plates and the pressure at which the suspension is pumped into the filter presses the fines into lumps of filter cake.

The filter plates are each fronted by permeable filter cloths and the filter cake adheres to the face cloth. The cloth is re-usable and it is necessary from time to time to remove the cake from the press and one way this is done by opening the plates sequentially pulling the cloth away from the plate and letting the cake fall away. With new filter cloths this happens easily but when the face cloth in particular, has become used, for examle after a number of cycles there is a tendency for it to be blinded by fine particles entrapped in the weave of the filter cloth and this causes the filter cake to stick to the cloth in spite of using a cake release mechanism.

One method of removing the cake is shown in PCT publication No WO 87/03504 where the cloth is given a whip-like action to release the cake.

It is therefore necessary in order to be able to ensure the press is operating at maximum efficiency to ensure that the filter cloths are regularly and efficiently cleaned. This can be done manually but this is obviously consumptive of labour and cannot be guaranteed in its efficiency for treating the whole surface of the cloth nor in its efficiency of washing. It is better to use an automatic device but with side bar presses fitted with cloths which pull away from the plate, automatic devices cannot normally be used since they need to be lowered from above the press, and the hangers and bars from which the filter cloths are suspended obstruct movement of the washers. Even with presses where the cloth is not pulled away from the plate, automatic devices cannot normally be used since they need to be lowered from above the press, and the hangers and bars from which the filter cloths are suspended obstruct movement of the washers. Even with presses where the cloth is not pulled away from the plate the location of the hangers can inhibit operation of a cloth washing machine.

It has been suggested that a washing machine should be located beneath the press and this could then come between the filter plates when they are opened. However, it ahs been found that this is not always practical and is often not able to be applied to existing designs of press.

It is therefore an object of the present invention to provide a form of hanger which enables an automatic washing device to be used from overhead with a side bar filter press in which the hanger does not impede the operation of the washer.

According to the present invention a filter press cloth hanger for a filter press comprises a pair of arms hingedly connected at one end and each including at their other end latching means for connection to a filter cloth suspension member in a filter press, and includes spring loaded extendable means carrying the latching means.

The spring loaded extendable means may comprise spring loaded rods constrained to move in a longitudinal direction in and out of housings attached to the arms. The latching means preferably comprises quick release means for connecting the extendable means to a filter cloth suspension member. The latching means may conveniently include key hole slots arranged to receive recessed ends of support bars comprising a filter cloth suspension member.

The arms of the hanger may have extension members between the hinged connection and the spring loaded extendable means and one or both of the extension members may be bent.

The arms of a hanger may be constructed with one longer than the other or, alternatively, a sleeve may be fitted to one spring loaded extendable member so as effectively to make one arm longer than the other. A restraining means, such as a chain, may be fitted between the arms of adjacent hangers to restrict their relative movement.

The invention also includes within its scope filter presses fitted with hangers in accordance therewith.

Figure 2:
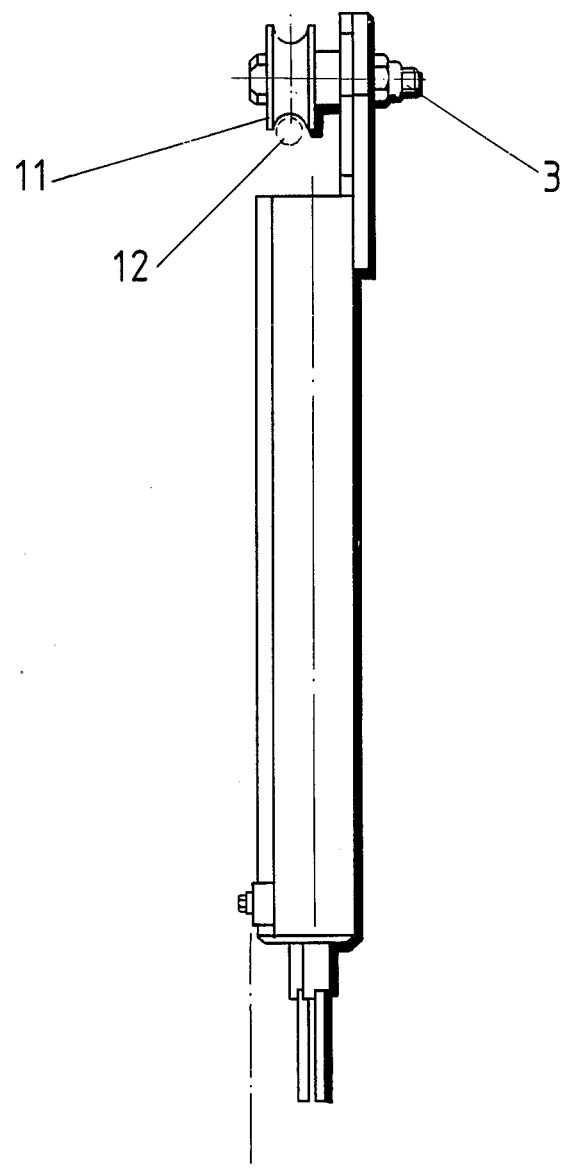
Figure 3:
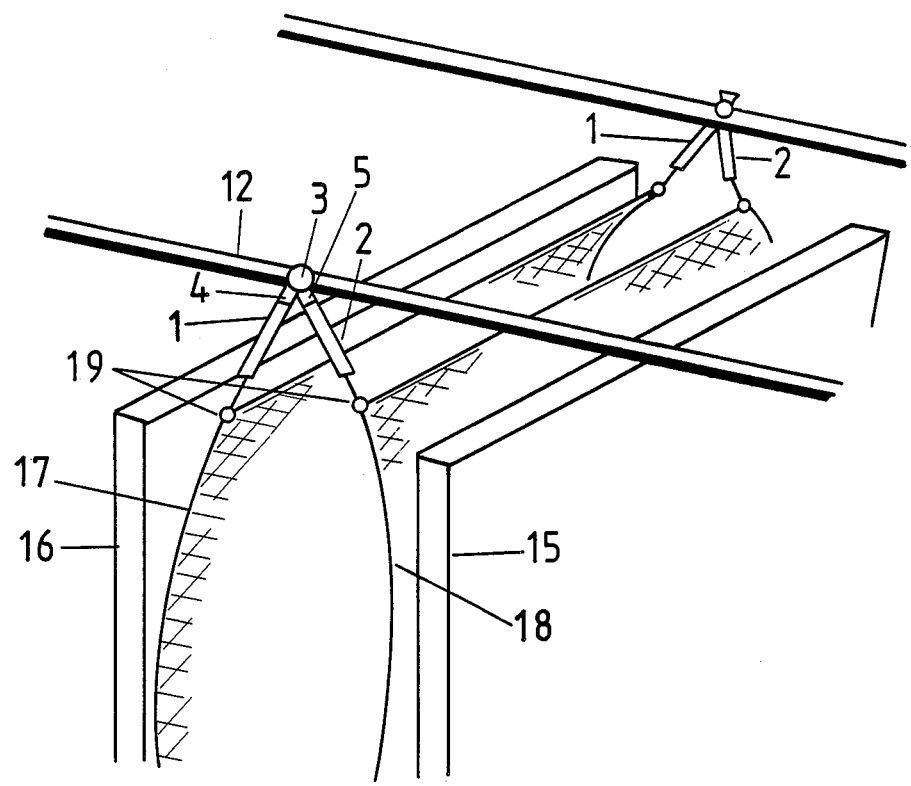
Figure 4:
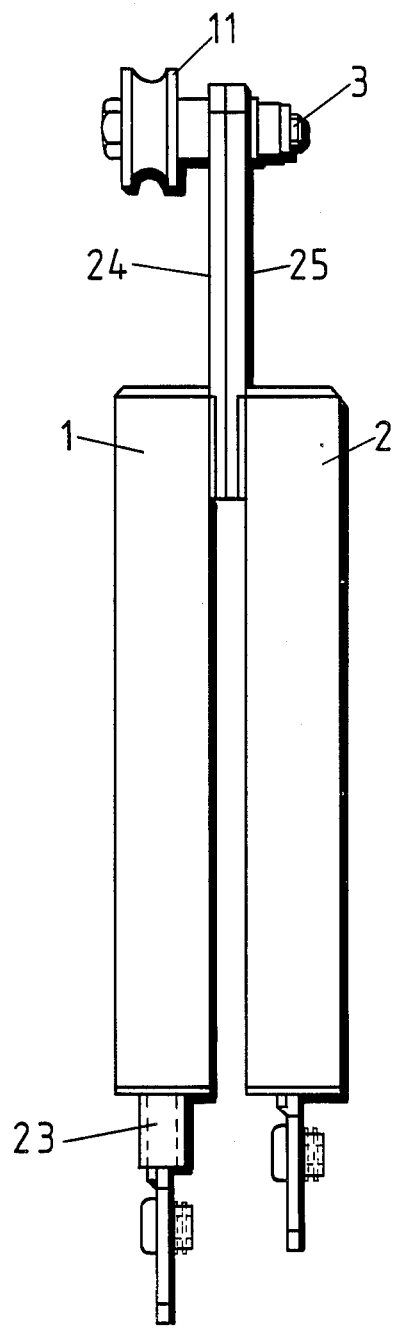
Figure 5:
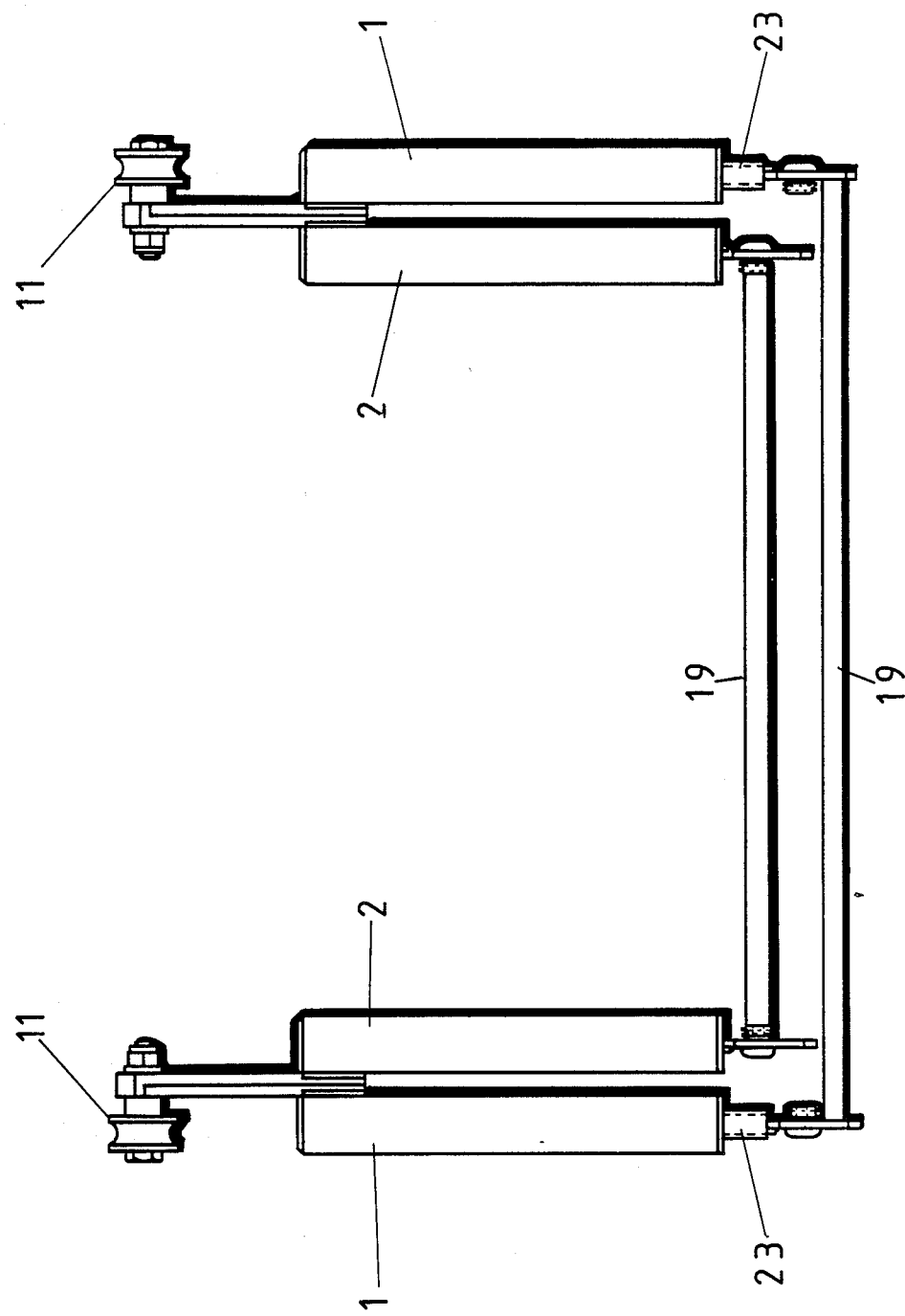
Figure 6:
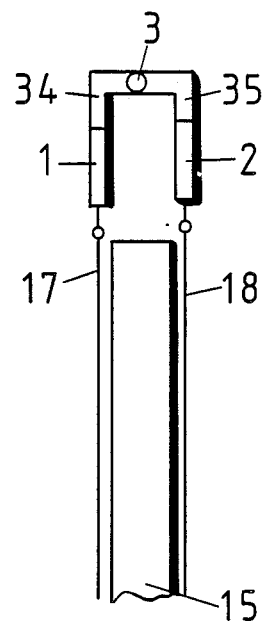
Figure 7:
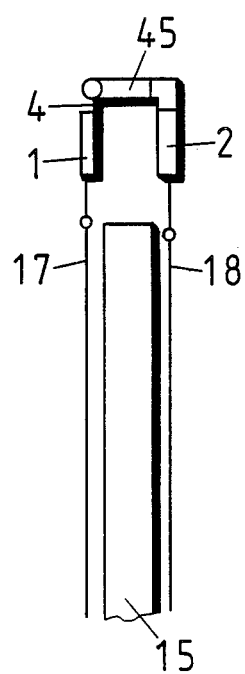

In order that the invention may be readily understood, one example of a filter press cloth hanger and three modification, in accordance therewith, will now be described by way of example only with reference to the seven Figures of the accompanying drawings. In the Figures, FIG. 1 shows an end view of a hanger in accordance with the present invention, FIG. 2 shows a side view of the hanger of FIG. 1, and FIG. 3 shows in schematic form the installation of a pair of hangers in a filter press. FIG. 4 shows an end view of a first modification of the hanger of FIG. 1 and FIG. 5 shows this in an installation. FIGS. 6 and 7 show two further modifications of the hanxger of FIG. 1 in scrap end view.

Referring now to the drawings, and particularly to FIGS. 1 and 2, the hanger comprises a pair of arms 1, 2, which are hinged at their upper end by a pivot bolt 3, which extends through plate like members 4, 5 respectively welded to the tops of the arms 1, 2.

Each arm 1, 2 is similar in construction and comprises the hollow tubular outer wall, 6, in which slides a spring loaded rod 7. The rod 7 carries at its lower end outside the arm a latching plate 8, which has a keyhole aperture 9, designed to fit over the end of a suspension member for a filter plate. The rod 7 carries at its free end within the hollow tubular outer wall 6, a stop member 10, which is screwed to the end of rod 7 and prevents the rod from being completely withdrawn from the tube 6. The stop 10 is also profiled to prevent rotation of the rod within the arm 1 and bears on one end of a compression spring 20 which biases the rod in the arm.

As can be seen, particularly from FIGS. 2, the pivot bolt 3 carries a roller 11, which can run along a support bar 12, extending the length of the side bar filter press on which the hanger is to be used.

Referring now also to FIG. 3, this shows a pair of hangers in accordance with the invention in use in a side bar filter press. The press in this instance comprises a plurality of filter plates of which only two, 15, 16 are shown. These plates are illustrated in FIG. 3 in the open position so that filter cloths 17, 18 associated respectively with each plate can be illustrated. It can be seen that the cloths are supported between the pair of hangers which are at each end of the plate 15 and 16 with the roller 11 of each hanger running along the support 12. The latching plate 8 at each arm is fitted onto a support rod 19 comprising the suspension member for each filter cloth and this rod 19 is recessed in a manner (not shown) so that the recess fits into the lower part of the keyhole aperture 9 of each latching plate 8.

Effectively the cloths are suspended by the arms 1, 2 and when the filter plates 15 and 16 are opened the arms 1, 2 pivot about the pivot bolt 3, and open out. This separates the filter cloth 17, 18, at their top and allows an automatic cloth washing machine (not shown) to be inserted between the cloth from the top. The cloth washing machine has a sparge arm which is lowered between the cloth and deflectors on the arm push out the supports 19, supporting the cloth thus allowing the sparge arm free downward passage and ensuring that spray nozzles extending from the arm do not catch on the cloth and damage it. As soon as the sprays are in position a high pressure water jet is ejected from each spray and the arm passes down and up the cloth as many times as necessary to dislodge all the solid particles of cake remaining in the cloth and to clean it thoroughly.

Once the sparge arm has completed its movement and washing action the arm is withdrawn upwardly and deflectors widen the gap between the supports 19 to allow the arm freely to move clear of the cloth. The filter plates are then closed and the next plate is opened so that the cloth washing machine can centralise itself over the the next chamber to repeat the washing action on the next pair of cloths. A chain 30 is provided between adjacent pairs of cloth hangers to restrain and centralise each hanger in the chamber between the two plates which are opened.

Referring now to FIGS. 4 and 5, a first modification of the hanger of FIG. 1 is shown here where the arms 1, 2 each have extension members 24, 25, which may be longer than the parts 4, 5 of FIG. 1, hinged on the bolt 3. The members 24, 25 are flat plates and being of extended length they allow the arms to pivot freely in use without there being any risk fouling on the support bar 12.

In this modification the arm 1 is shown as being effectively longer than the arm 2 by the use of a sleeve 23 which is fitted around the lower end of rod 7 of arm 1. The purpose of this extension can clearly be seen from the schematic of FIG. 5 where the support rod 19 joining arms 2 is able to be positioned along the rod 19 joining arms 1. This allows for the arms 1 and 2 of each hanger to lie above each other in minimum horizontal space.

The arm 1 could, of course, be made longer than the arm 2 to achieve the same effect. However, the use of the sleeve 23 is a convenient way of reducing manufacturing costs and allowing common components for arms 1 and 2 to be used.

Two further modifications of the hanger are shown in FIGS. 6 and 7. These modifications are for filter presses where the hanger supports cloth on either side of a filter plate rather than two adjacent plates, as shown in FIG. 3. In FIG. 6 the pivot bolt 3 is positioned centrally above filter plate 15 and cloths 17, 18 hang on each side of the plate. The arms 1, 2 each have bent extension members 34, 35 to hold the cloths parallel with their associated side of the plate 15.

In FIG. 7, pivot bolt 3 is positioned over the cloth and the arm 1 is as shown in FIG. 1. The arm 2 has an lengthened extension member 45 which is bent to hold arm 2 over the other side of plate 15 and to suspend cloth 18 parallel to it.

The use of the invention of FIGS. 1 to 5 enables the filter plate of a side bar (or overhead type) filter press to be fitted with a cloth which is pulled away from the plates when the press is opened and to be more effectively and efficiently cleaned than has previously been the case since overhead washing facilities are able to be introduced. The device can also be used for overhead type presses where the cloth washing machine moves only underneath the press. The operation is swift and speedy as well as being effective. The provision of the novel filter cloth hanger provides a means whereby the cloths may be readily replaced when necessary and also they are themselves able easily to be replaced if damaged. However, they are simple in construction and by virtue of this are basically maintenance free.

I claim:

1. A filter press cloth hanger for a filter press comprising a pair of arms hingedly connected at their upper ends an each including at their lower ends latching means for attaching each arm to a respective filter cloth suspension member to the lower end of the arm in a filter press, each of said arms including spring loaded extendable means carrying the latching means and means for suspending the cloth hanger above the filter press via the hinged connection.

2. A filter press cloth hanger as claimed in claim 1 in which the spring loaded extendable means include spring loaded rods constrained to move in a longitudinal direction in and out of housings attached to the arms.

3. A filter press cloth hanger as claimed in claim 1, in which the latching means comprise quick release means for connection the spring loaded extendable means to a filter cloth suspension member.

4. A filter press cloth hanger as claimed in claim 3, in which the latching means include key hole slots arranged to receive ends of support bars comprising said filter cloth suspension member.

5. A filter press cloth hanger as claimed in claim 1, in which the arms each include an extension member between the hinged connection and the spring loaded extendable means.

6. A filter press cloth hanger as claimed in claim 5, in which one of the extension members is bent.

7. A filter press including cloth hangers as claimed in claim 6, in which the press includes a plurality of filter plates each covered on either side by a filter cloth, the cloths being separable to allow cleaning of the cloths and the cloth on either side of the same plate being suspended from suspension members located above the plate and connected at each end to the arms of the cloth hangers.

8. A filter press cloth hanger as claimed in claim 5, in which both extension members are bent.

9. A filter press cloth hanger as claimed in claim 1, in which one arm of a pair of arms is longer than the other.

10. A filter press cloth hanger as claimed in claim 1, in which the spring loaded extendable means of one of the arms is fitted with a sleeve member adjacent the latching means so as effectively to lengthen the said one arm.

11. A filter press cloth hanger as claimed 1 and including restraining means for restraining the degree of movement of one hanger relative to an adjacent hanger.

12. A filter press cloth hanger as claimed in claim 11, in which the restraining means comprises a chain secured to each arm.

13. A filter press including cloth hangers as claimed in claim 1, in which the press includes a plurality of filter plates each covered on either side by a filter cloth, the cloths being suspended from suspension members located above the press and connected at either end to arms of the cloth hangers.

* * * * *